United States Patent
Donovan

(10) Patent No.: US 7,830,888 B2
(45) Date of Patent: Nov. 9, 2010

(54) METHOD AND SYSTEM OF PROVIDING DIFFERENTIATED SERVICES

(75) Inventor: Steven R. Donovan, Plano, TX (US)

(73) Assignees: Verizon Business Global LLC; Verizon Services Corp.; Verizon Communications Inc., New York, NY (US)

( * ) Notice: Subject to any disclaimer, the term of this patent is extended or adjusted under 35 U.S.C. 154(b) by 899 days.

(21) Appl. No.: 11/130,317

(22) Filed: May 16, 2005

(65) Prior Publication Data

US 2005/0213584 A1    Sep. 29, 2005

Related U.S. Application Data

(63) Continuation of application No. 09/435,540, filed on Nov. 8, 1999, now Pat. No. 6,970,930.

(60) Provisional application No. 60/163,913, filed on Nov. 5, 1999.

(51) Int. Cl.
*H04L 12/28* (2006.01)

(52) U.S. Cl. ............ 370/395.21; 370/351; 370/389; 370/395.1; 370/395.2; 370/395.5

(58) Field of Classification Search ............ 370/395.21
See application file for complete search history.

(56) References Cited

U.S. PATENT DOCUMENTS

| | | |
|---|---|---|
| 5,130,983 A | 7/1992 | Heffner |
| 5,315,586 A | 5/1994 | Charvillat |
| 5,586,121 A | 12/1996 | Moura et al. |
| 5,634,012 A | 5/1997 | Stefik et al. |
| 5,680,116 A | 10/1997 | Hashimoto et al. |
| 5,745,694 A | 4/1998 | Egawa et al. |
| 5,825,772 A | 10/1998 | Dobbins et al. |
| 5,867,571 A | 2/1999 | Borchering |
| 5,883,894 A | 3/1999 | Patel et al. |
| 5,889,777 A | 3/1999 | Miyao et al. |
| 5,903,559 A | 5/1999 | Acharya et al. |
| 5,903,735 A | 5/1999 | Kidder et al. |
| 5,909,430 A | 6/1999 | Reaves |
| 5,930,348 A | 7/1999 | Regnier et al. |
| 5,933,412 A | 8/1999 | Choudhury et al. |
| 5,953,338 A | 9/1999 | Ma et al. |
| 5,960,416 A | 9/1999 | Block |
| 5,991,292 A | 11/1999 | Focsaneanu et al. |

(Continued)

OTHER PUBLICATIONS

Arao et al., "Component-Based Policy Deployment for Service Level Differentiation in Converging Communication Networks," IEEE International Conference on Communications, Jun. 10, 1999, vol. 2, pp. 1388-1392.

(Continued)

*Primary Examiner*—Daniel J Ryman
*Assistant Examiner*—Cassandra Decker

(57) ABSTRACT

A method for combining Internet protocols in a Differentiated Services model environment is described. The Session Initiation Protocol (SIP) and Common Open Policy Service (COPS) are combined together to provide methods of setting up a session and tearing down a session, while maintaining Authentication, Authorization, and Accounting (AAA) policies. The Open Settlement Policy (OSP) is also combined with SIP and COPS. This combination provides for an interchange of parameters between session setup, teardown, authorization, policy, Quality of Service (QoS), and usage reporting.

12 Claims, 5 Drawing Sheets

U.S. PATENT DOCUMENTS

| | | | |
|---|---|---|---|
| 6,058,113 A | 5/2000 | Chang | |
| 6,073,160 A | 6/2000 | Grantham et al. | |
| 6,088,358 A | 7/2000 | Tomita et al. | |
| 6,097,722 A | 8/2000 | Graham et al. | |
| 6,108,314 A | 8/2000 | Jones et al. | |
| 6,137,777 A | 10/2000 | Vaid et al. | |
| 6,141,686 A | 10/2000 | Jackowski et al. | |
| 6,151,319 A | 11/2000 | Dommety et al. | |
| 6,157,648 A | 12/2000 | Voit et al. | |
| 6,195,355 B1 | 2/2001 | Demizu | |
| 6,205,148 B1 | 3/2001 | Takahashi et al. | |
| 6,216,006 B1 | 4/2001 | Scholefield et al. | |
| 6,295,532 B1 | 9/2001 | Hawkinson | |
| 6,298,383 B1* | 10/2001 | Gutman et al. | 709/229 |
| 6,324,279 B1 | 11/2001 | Kalmanek et al. | |
| 6,343,326 B2 | 1/2002 | Acharya et al. | |
| 6,366,577 B1 | 4/2002 | Donovan | |
| 6,385,203 B2 | 5/2002 | McHale et al. | |
| 6,426,955 B1* | 7/2002 | Gossett Dalton et al. | 370/401 |
| 6,434,153 B1* | 8/2002 | Yazaki et al. | 370/395.21 |
| 6,473,404 B1* | 10/2002 | Kaplan et al. | 370/238 |
| 6,487,170 B1 | 11/2002 | Chen et al. | |
| 6,578,076 B1 | 6/2003 | Putzolu | |
| 6,581,102 B1 | 6/2003 | Amini et al. | |
| 6,584,093 B1 | 6/2003 | Salama et al. | |
| 6,594,277 B1 | 7/2003 | Chiang et al. | |
| 6,678,264 B1 | 1/2004 | Gibson | |
| 6,678,835 B1 | 1/2004 | Shah et al. | |
| 6,714,515 B1 | 3/2004 | Marchand | |
| 6,714,987 B1 | 3/2004 | Amin et al. | |
| 6,728,365 B1 | 4/2004 | Li et al. | |
| 6,735,630 B1 | 5/2004 | Gelvin et al. | |
| 6,745,207 B2 | 6/2004 | Reuter et al. | |
| 6,765,927 B1 | 7/2004 | Martin et al. | |
| 6,775,701 B1 | 8/2004 | Pan et al. | |
| 6,801,542 B1* | 10/2004 | Subbiah | 370/467 |
| 6,801,940 B1 | 10/2004 | Moran et al. | |
| 6,823,385 B2 | 11/2004 | McKinnon et al. | |
| 6,826,613 B1 | 11/2004 | Wang et al. | |
| 6,845,106 B2 | 1/2005 | McKinnon et al. | |
| 6,854,014 B1 | 2/2005 | Amin et al. | |
| 6,857,012 B2 | 2/2005 | Sim et al. | |
| 6,914,883 B2 | 7/2005 | Dharanikota | |
| 6,973,035 B2 | 12/2005 | Seddigh et al. | |
| 7,046,680 B1 | 5/2006 | McDysan | |
| 7,069,337 B2 | 6/2006 | Rawlins et al. | |
| 7,146,425 B2 | 12/2006 | Oottamakorn et al. | |
| 7,212,495 B2 | 5/2007 | Karri et a | |
| 7,307,954 B1 | 12/2007 | Strandberg et al. | |
| 2001/0025310 A1 | 9/2001 | Krishnamurthy et al. | |
| 2001/0027490 A1 | 10/2001 | Fodor et al. | |
| 2001/0048682 A1 | 12/2001 | Fichou et al. | |
| 2002/0016839 A1 | 2/2002 | Smith et al. | |
| 2002/0026513 A1 | 2/2002 | Hoglund et al. | |
| 2004/0022191 A1 | 2/2004 | Bernet et al. | |

OTHER PUBLICATIONS

Barzilai et al., "Design and Implementation of an RSVP-Based Quality of Service Architecture for Integrated Services Internet", 1997, IEEE.

Bernet et al, "A Framework for Differentiated Services", Feb. 1999, http://www.ietf.org/internet-draft-ieft-diffserv-framework-02.txt.

Boyle et al., "The COPS (Common Open Policy Service) Protocol", Aug. 1999, http://www.ieft.org/internet-drafts/draft-ieft-rap-cops-07.txt.

Boyle et al., "COPS Usage for RSVP", Jun. 1999, http://www.ieft.org/internet-draft-ieft-diffserv-framework-02.txt.

Braden et al., "Resource ReSerVation Protocol (RSVP): Version 1 Functional Specification", Sep. 1997, Network Working Group RFC 2205, ftp://ftp.isi.edu/in-notes/rfc2205.txt.

Braun, T., "Internet Protocols for Multimedia Communications", Oct. 1997, IEEE Multimedia.

Eriksson et al., "SIP Telephony Gateway on DTM", Jul. 2, 1999, Bachelor's Thesis, Royal Institute of Technology, Sweden.

Rosenberg et al., "Internet Telephony Gateway Location", 1998, IEEE, PP. 488-496.

Schulzrinne et al., "Interaction of Call Setup and Resource Reservation Protocols in Internet Telephony", Jun. 15, 1999, Technical Report.

Schulzrinne et al., "Signaling for Internet Telephony", Feb. 2, 1998, Columbia University, Dept. of Computer Science Technical Report CUCS-005-98.

Schulzrinne, H., "A Comprehensive Multimedia Control Architecture for the Internet", 1997, IEEE, pp. 65-76.

Sinnreich et al., "Interdomain IP Communications with QoS, Authentication and Usage Reporting", Feb. 2000, Internet Draft.

Sinnreich et al., "AAA Usage for IP Telephony with QoS", Mar. 3, 2000, http://www.fys.ruu.nl/~wwwfi/aaaarch/pittsburg/sinnreich/sld001.htm.

Sinnreich et al., "AAA Usage for IP Telephony with QoS", IEFT Internet Draft, Jul. 2000.

Wedlund et al., "Mobility Support Using SIP, 1999, Association for Computing Machinery", pp. 76-82.

White, P., "RXVP and Integrated Services in the Internet: A Tutorial", May 1997, IEEE Communications Magazine.

Wroclawski, J., "The Use of RSVP with IETF Intergrated Services" Sep. 1997, ftp://ftp.isi.edu/in-notes/rfc2210.txt.

Yavatkar et al., "A Framework for Policy-Based Admission Control", Mar. 1999, http://www.ietf.org/internet-drafts/draft-ietf-rap-framework-03.txt.

Braden, R., Clark D. and S. Shenker, "Integrated Services in the Internet Architecture: an Overview," RFC 1633, Jul. 1994.

Blake, S., Black, D. Carlson, M., Davies, F.., Wang, Z. and W. Weiss, "An Architecture for Differentiated Services," RFC 2475, Dec. 1998.

Rosen, L. and Y. Rekhter, "BGP/MPLS VPNs," RFC 2547, Mar. 1999.

Gleeson, B., Lin., A., Heinanen, J., Finland, T., Armitage, G. and A. Malis, "A Framework for IP Based Virtual Private Networks," RFC 2764, Feb. 2000.

Daniele, M., Haberman, B., Routhier, S. and J. Schoenwaelde, "Textual Conventions for Internet Network Addresses," RFC 2851, Jun. 2000.

Bernet, Y., Ford, P., Yavatkar, R., Baker, F., Zhang, L., Speer, M., Braden, R., Davie, B., Wroclawski, J. and E. Felstaine, "A Framework for Integrated Services Operation over Diffserv Networks," RFC 2998, Nov. 2000.

Ping et al., "Diameter: Policy and Accounting Extension for SIP", Internet Draft, Nov. 15, 1998, <http://www.es.columbia.edu/sip/drafts/draft-pan-diameter-sip-01.txt>.

Ekstein et al., "AAA Protocols: Comparison Between Radius and Diameter and COPS", Internet Draft, Aug. 1999, <http://search.ietf.org/internet-drafts/draft-ekstein-roamops-protocol-00.txt>.

Hubaux et al., "The Impact of the Internet on Telecommunication Architectures", Computer Networks, Elsevier Science Publishers B. V., Amsterdam, NL, Feb. 11, 1999, vol. 31, No. 3, pp. 257-273.

Kauser et al., "A Charging Model for Sessions on the Internet", Computers and Communications, 1999 Proceedings IEEE International Symposium on Red Sea, Egypt, Jul. 6-8, 1999, Los Alamitos, CA, USA, IEEE Computer Society, US, Jul. 6, 1999, pp. 32-38.

Wright et al., "IP Telephony vs. ATM: What is There to Discuss?" 1998 1st IEEE International Conference on ATM, ICATM'98 Conference Proceedings, Colmar, France, Jun. 22-24, 1998, IEEE International Conference on ATM, New York, NY, IEEE, US, Jun. 22, 1998, pp. 400-409.

Brazilai et al., "Design and Implementation of an RSVP-Based Quality of Service Architecture for Integrated Services Internet", Distributed Computing Systems, 1997, Proceedings of the 17th International Conference on Baltimore, MD, US, May 27-30, 1997, Los Alamitos, CA, US, IEE Computer Soc., US, May 27, 1997, pp. 543-551.

Handley et al., "SIP: Session Initiation Protocol", IETF RFC 2543, Mar. 31, 1999, pp. 7-17.

Sinnreich et al., "AAA Usage for IP Telephony with QoS", Internet Draft, Jan. 2001, pp. 1-20.

Stojsic et al., "Formal Definition of SIP Proxy Behavior", 2001 IEEE, pp. 289-292.

Salsano et al., "QoS Control by Means of COPS to Support SIP-Based Applications", Mar./Apr. 2002, pp. 27-33.

Flykt et al., "SIP Services and Interworking with Ipv6", Mar. 2001, pp. 186-190.

Neilson et al., "Discussion of Bandwith Broker Requirements for Internet2 Qbone Deployment Version 0/7", IEEE Internet Draft, Aug. 1999, pp. 1-30.

Kumar et al., "Beyone Best Effort" Router Architectures for the Differentiated Services of Tomorrow's Internet, IEEE Communications Magazine, IEEE Service Center, Piscataway, NJ, US, vol. 36, No. 5, May 1, 1998, pp. 152-164.

Balmer et al., "A Concept for RSVP Over DiffServ", Computer Communications and Networks, 2000 Proceedings, Ninth International Conference on Las Vegas, NV, US, Oct. 2000, pp. 412-417.

Bernet, "The Complementary Roles of RSVP and Differentiated Services in the Full-Service QOS Network", IEEE Communications Magazine, IEEE Service Center, Piscataway, NJ, US, vol. 39, No. 2, Feb. 2000, pp. 154-162.

Mamais et al., "Efficient Buffer Management and Scheduling in a Combined IntServ and DiffServ Architecture: A Performance Study", ATM, 1999 ICATM '99, 199 $2^{nd}$ International Conference on Colmar, France, Jun. 21-23, 1999, Piscataway, NJ, US, IEEE, US, Jun. 21, 1999, pp. 236-242.

Detti et al., "Supporting RSVP in a Differentiated Service Domain: An Architectural Framework and a Scalability Analysis", ICC '99, 1999 IEEE International Conference on Communications, Conference Record, Vancouver, CA, Jun. 6-10, 1999, IEEE International Conference on Communications, New York, NY: IEEE, US, vol. 1, Jun. 6, 1999, pp. 204-210.

Hussmann et al., "An Edge Device for Supporting Internet Integrated Services Over Switched ATM Networks", Interoperable Communications Network, Baltzer Science Publishers, Bussum, NL, Sep. 1998, pp. 321-330.

Mascolo et al., "An XML based Programmable Network Platform", Proc. of the ICSE Workshop on Software Engineering and Mobility. Toronto Canada. May 2001 [14].

Beck et al., "Scheduling Alternative Activities", American Association for Artificial Intelligence, 1999[14].

Tsaoussidis et al., "A CORBA-based Application Service Middleware: Architecture and Implementation", *4th IEEE Symposium on Computers and Communications*, IEEE ISCC '99, pp. 130-136, IEEE Computer Society Press, Red Sea, Egypt, Jul. 1999[14].

Aiken et al., "Network Policy and Services: A Report of a Workshop on Middleware", Internet Engineering Task Force, Request for Comment 2768, Feb. 2000.

Aspnes et al., "On-Line Routing of Virtual Circuits with Applications to Load Balancing and Machine Scheduling", Journal of the ACM, vol. 44, No. 3, May 1997, pp. 486-504.

Bhuyan et al., "Impact of Switch Design on the Application Performance of Cache-Coherent Multiprocessors", 1998, http://www.cs.tamu.edu/people/ravi/IPP.S98.ps.gz.

Handley et al., "SIP: Session Initiation Protocol", IETF RFC 2543, http://www lett.orldrtc/rfc2543,txt, pp. 7-17, Mar. 31, 1999.

IPHighway Product Overview, http://iphighway.com/prod/, pp. 1-4, Sep. 22, 1999.

Roberts, E., "The New Class System: Comprehensive Approaches Give Net Managers the Power to Prioritize . . . " http://www.data.com/roundups/class_system.html, pp. 1-14, Oct. 1997.

* cited by examiner

Internet Protocol v.4 Header

METHOD AND SYSTEM OF PROVIDING DIFFERENTIATED SERVICES

Related Applications

The present application is a continuation of U.S. Pat. application Ser. No. 09/435,540 filed on Nov. 8, 1999, which claims the benefit of U.S. Provisional Patent Application Ser. No. 60/163,913 filed on Nov. 5, 1999; the entireties of which are hereby incorporated by reference.

BACKGROUND OF THE INVENTION

1. Field of the Invention

The present invention relates generally to the field of Internet multimedia communication, and, more particularly, to a method for combining Internet protocols for session setup, teardown, authorization, and accounting in a Internet Protocol (IP) network, which uses the DiffSERV (Differentiated Services) model in order to guarantee Quality of Service (QoS).

2. Description of the Related Art

The invention of the telephone opened an unprecedented era in personal communication. At the present time, the Internet is opening up another era in personal communication, allowing a level of interactivity previously unknown between computers and groups of computers. In the future, these two services will be combined into one seamless communication medium.

However, the concepts underlying the telephone system and the Internet are fundamentally different. The telephone system is circuit-based; meaning that, for example, when a call is set up between caller and caller, a dedicated line, or circuit, is maintained between the two, and, when the call is over, the dedicated line is taken down. The Internet is packet-based; meaning that, for example, when a user downloads a web page, or receives an e-mail, the data that comprises the web page or e-mail is broken down into packets before being transmitted. The individual packets, although they form one web page or one e-mail message, may take entirely different routes between the sender and the destination. The destination computer puts all the packets together to form the web page.

A fundamental problem lies in providing a circuit-based service, such as a telephone call or videoconferencing, over a packet-based network. While the answer may appear simple-digitize and packetize the audio or visual information—the situation is more complicated than it appears. For one thing, an application such as a telephone call requires a constant transmission rate; something the current Internet cannot guarantee. An application such as videoconferencing using MPEG has stringent real-time requirements in order to avoid the displayed motion appearing jerky. These requirements include a variable transmission rate and very little jitter in the packet arrival times. Once again, at present the Internet cannot guarantee these requirements will be met.

One system for addressing these Quality of Service (QoS) issues on the Internet is the DiffServ model or Differentiated Services architecture (RFC 2475). In DiffServ, packet traffic shaping is implemented by network routers. In order to specify the transmission requirements, DiffServ uses the Type of Service (ToS) bits in the Internet Protocol (IP) packet header (see FIG. 1). Although the ToS field exists in the current protocol IPv4 (Internet Protocol, version 4), most routers do not use or read the bits in the ToS field. DiffServ uses these bits to tell the router the priority of the packet. Because of this, the ToS field in the IP header is referred to as the DS field.

DiffServ is implemented in the following manner: when packet traffic enters a DiffServ network, the packets are classified and possibly conditioned at the network boundary, most likely in an edge router. The DS field will be filled in with the appropriate bits for that type of traffic, which may depend on customer usage, media specification, general policy, etc. The network nodes inside the DiffServ network will read the DS field to determine how to manage incoming packets. For instance, if an edge router recognizes incoming packets as being high priority, the router will classify those packets as high priority in the DS field, and then send those packets inside the network. When those high priority packets reach a network node, the node will forward them before other packets, because the DS field indicates that they are high priority. This example is somewhat of a simplification, for the DS field classification scheme is more complicated than merely high or low priority, and takes into account throughput, delay, jitter, packet loss, and other traffic characteristics. Taken together, these traffic characteristics make up Quality of Service (QoS).

Because DiffServ classifies these packets into different categories, it works only upon "flow aggregates," which refers to a collection of packet flows. In other words, an interior network node does not know what a packet contains or if that packet is part of a series of packets; the interior node merely treats it as a member of a certain classification of traffic characteristics. This is in contrast to another method of assuring QoS over a network, the Resource ReSerVation Protocol (RSVP). RSVP sets up a path from network node to network node for a particular packet flow. For example, if an end client device wishes to establish a telephone call over the network, the device would use RSVP to establish a path to the callee's end client device through one or more network nodes. The individual network nodes on the path would then know that a particular identified packet flow will require certain traffic conditions, and resources will be reserved for them. When a node receives one of the packets in the series of packets, the node will recognize it and behave accordingly. While DiffServ looks at flow aggregates, RSVP looks at individual "micro-flows."

For the rest of this description; a DiffServ environment will be assumed. This means that the QoS requirements will be handled by edge routers which will tag individual packets appropriately, while interior network nodes will act upon packets based merely on their DS field.

Even assuming the QoS problems are being handled by DiffServ, there are other services automatically handled in a circuit-based environment which are problematic in an IP-based network. A call has to be set up, establishing a connection between the two end devices, and the resources used in an individual call or session must be tracked, for accounting purposes. In addition, there needs to be the capability to have only authorized sessions or calls from authenticated users. In the Internet framework, these issues are resolved by different protocols that do different things. Although these individual protocols have been developed in detail, there is at present known method that sets forth how to use them together in a consistent way across the Internet.

Thus, there is a need for linking these protocols together in a consistent and workable way. In particular, there is a need for a method providing an interchange of parameters among protocols between session setup, authorization, policy, and usage reporting that will support IP communications between Internet Service Providers (ISPs), enterprise networks, and individual clients.

SUMMARY OF THE INVENTION

The present invention provides a method for providing an interchange of parameters among protocols for session setup, teardown, authorization, policy, and usage reporting that will support IP communications in a Differentiated Services model environment.

The present invention provides a method for session or call setup, teardown, authorization, policy and usage reporting in a common way of usage, thereby supporting IP communications across the Internet.

The present invention also provides a method to link together the Session Initiation Protocol (SIP), Common Open Policy Service (COPS), and Open Settlement Policy (OSP) in a Differentiated Services model environment.

These and other objects are achieved by the preferred embodiment of the present invention. In the preferred embodiment, the messages from the Session Initiation Protocol (SIP), Common Open Policy Service (COPS), and Open Settlement Policy (OSP) are interwoven so that session setup, authorization, policy, and usage reporting are all performed concurrently, in one unified sequence of messages. Likewise, the messages from the Session Initiation Protocol (SIP), Common Open Policy Service (COPS), and Open Settlement Policy (OSP) are interwoven so that session teardown, authorization, policy, and usage reporting are all performed concurrently, in one unified sequence of messages.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENTS

As stated above, in the prior art there has been no linkage between the individual protocols that provide for call setup, authorization, accounting, and authentication. These steps are taken care of by the following protocols:

Session Initiation Protocol (SIP)—for setting up connections or calls;

Common Open Policy Service (COPS)—for policy deployment in network elements; and Open Settlement Protocol (OSP)—for authorization and usage reporting.

These protocols will be discussed in detail below. In these discussions, the terms "client" and "server" will be used in their abstract functional sense, as process that may be implemented in any sort of device. This means, of course, that some servers and clients may be running in the same device.

a) Session Initiation Protocol (SIP)

SIP is a signaling protocol that allows for initiating and tearing down connections. There are two components in a SIP system: network servers and user agents. A user agent is an end system that acts on behalf of someone who wants to participate in calls. In general, the user agent contains both a protocol client (a user agent client UAC) which initiates a call and a protocol server (user agent server UAS) which responds to a call (see FIG. 2). There are two different type of network servers as well: a proxy server, which receives requests, determines which server to send it to, and then forwards the request; and a redirect server, which receives requests, but instead of forwarding them to the next hop server, tells the client to contact the next hop directly.

Figure 1:
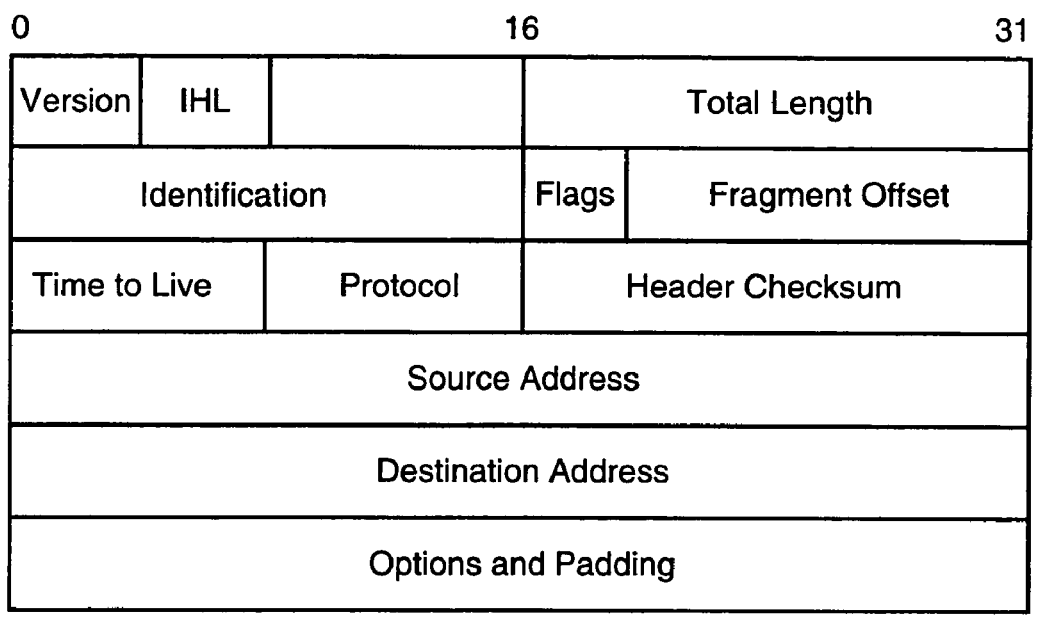
FIG. 1 shows an Internet Protocol Header.
Figure 2:
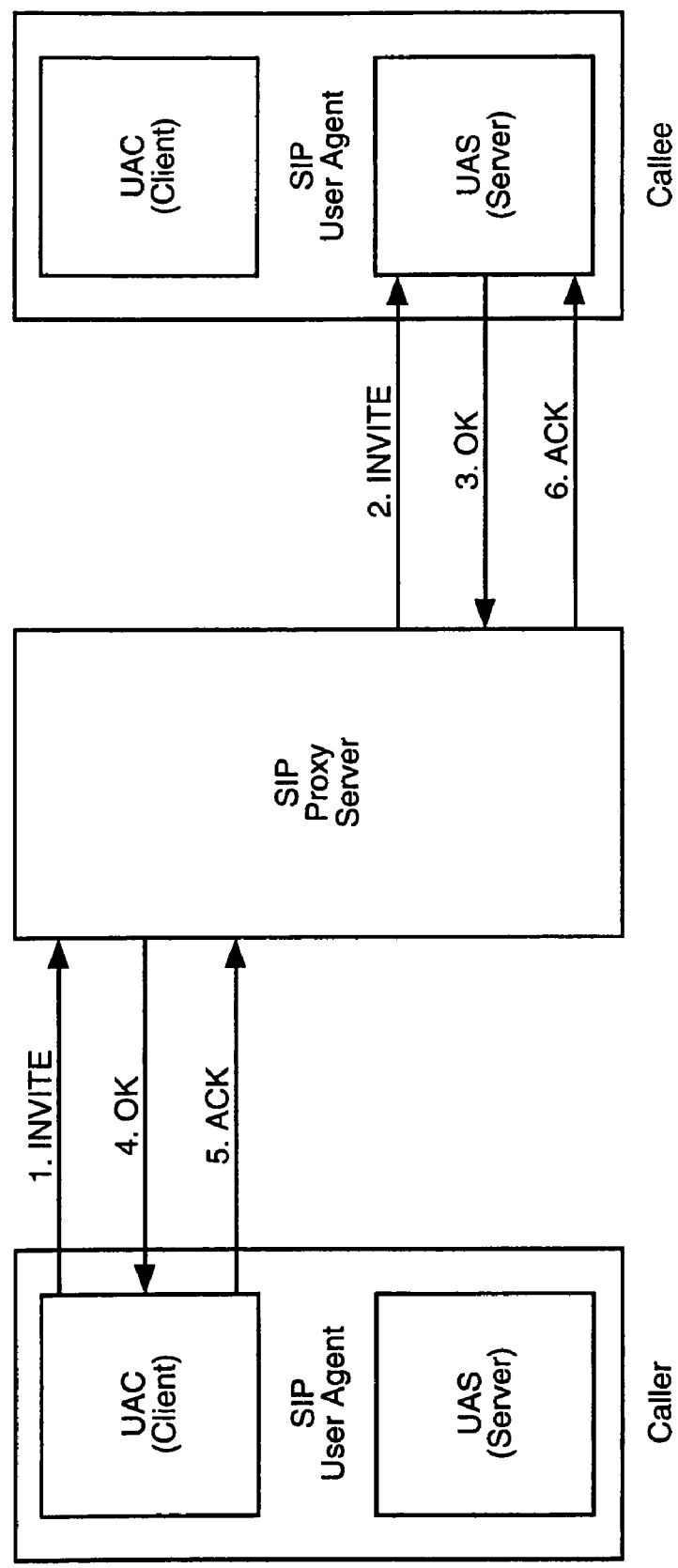
FIG. 2 shows the components of a SIP-based network and an overview of initiating a session.

The steps in initiating a session are fairly simple: as shown in FIG. 2, (1) the UAC sends an INVITE request to a SIP server, which in this case, is a proxy server. The proxy server will look in its database to determine where to send the INVITE request Once that is determined, the proxy server sends the INVITE message to the appropriate next hop. In FIG. 1, the next hop is the callee, but, in reality, there could be a number of hops between the proxy server and the callee. If the proxy server is a redirect server, it would inform the UAC what the appropriate next hop is, and let the UAC do the rest. Once (2) the INVITE message finally reaches the callee UAS, (3) the callee UAS responds with an OK message, which (4) is forwarded to the caller UAC. When the caller UAC receives the OK message, indicating the callee has received the INVITE, (5) the UAC sends an ACK message, which, when (6) received, will start the session.

The steps in terminating a session, or teardown, are even more simple: the UAC sends a BYE message, and the UAS sends a message indicating receipt of the BYE message. In SIP, either the UAC or the UAS may send the BYE message terminating a session.

b) Common Open Policy Service (COPS)

Figure 3:
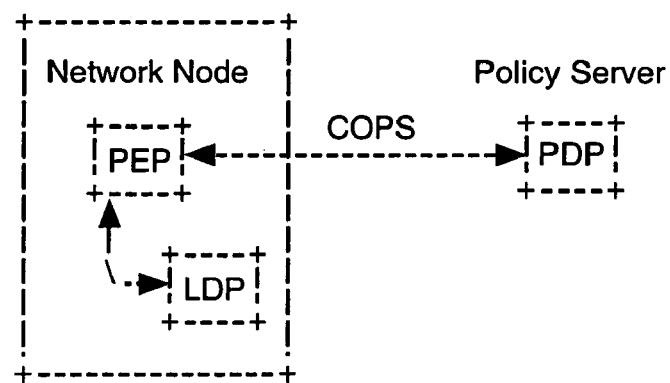
FIG. 3 shows the components of a Common Open Policy Service (COPS) system.

COPS is a simple query and response protocol that can be used to exchange information between a policy server (Policy Decision Point or PDP) and its clients (Policy Enforcement Points or PEPs), as shown in FIG. 3 A policy is a combination of rules and services that define the criteria for resource access and usage. In COPS the PEP sends request updates, and deletions to the PDP and the PDP returns decisions back to the PEP. The basic message formats for COPS include Requests (REQs), Decisions (DECs), and Report States (RPTs), among many others.

When particular events occur at a PEP, such as the initiation of a session, the PEP will send a REQ to the PDP to determine the policy regarding the session. The REQ may be an Authentication, Authorization Accounting (AAA) REQ, which is asking that the session be authorized, authenticated, and track of for accounting purposes. If the PDP determines the session fits the AAA policy, the PDP will send its decision DEC to the PEP, thus allowing the PEP to allocate the needed resources. The RPT message is used by the PEP to communicate to the PDP its success or failure in carrying out the PDP's decision, or to report an accounting related change in state.

c) Open Settlement Protocol (OSP)

Figure 4:
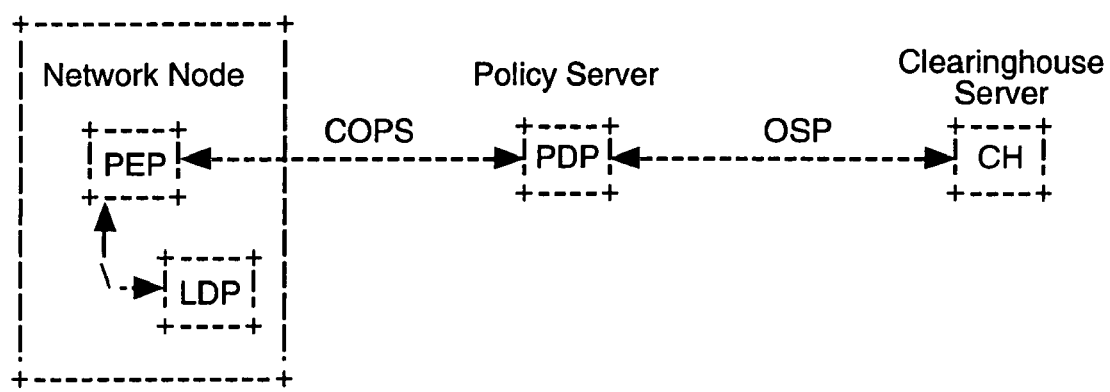
FIG. 4 shows the components of a Open Settlement Protocol (OSP) system.

OSP is used when there is a central clearinghouse for certain policy decisions. As shown in FIG. 4, OSP is the protocol describing communication between the policy server PDP and the clearinghouse server. This is needed in large networks which require multiple policy servers. Among other things, authorization for QoS levels is handled by the clearinghouse server. The clearinghouse server can also be a trust broker between a large number of network providers and the collecting place for usage reports. As an example, if a PEP sends a REQ AAA to a PDP, the PDP sends a message to the clearinghouse server in order to authorize the call or session. This message is in the form of a <AuthReq>, and the clearinghouse server responds with a <AuthRsp>, which may or may not contain an authorization token, which permits the REQ AAA to proceed. In addition, when a connection or session ends, the use of resources for that session or connection must be recorded for accounting purposes. When the policy server PDP de-installs a particular QoS policy, i.e. registers the end of a session, the policy server PDP sends a <UsageInd> message to the clearinghouse server so that the resource usage is recorded as well as monitored. The clearinghouse confirms the <UsageInd> with a <UsageCnf>.

As stated above, these protocols have been extensively defined and implemented, but to date there has been no common way of usage for combining them. A preferred embodiment of the present invention, as described below, combines these protocols in order to provide a consistent and common manner of usage for IP-based networks using the Differentiated Services model. In the description below of FIG. 5, a session setup according to the preferred embodiment of the invention will be explained in detail. In the description below of FIG. 6, a session teardown will be explained in detail.

Figure 5:
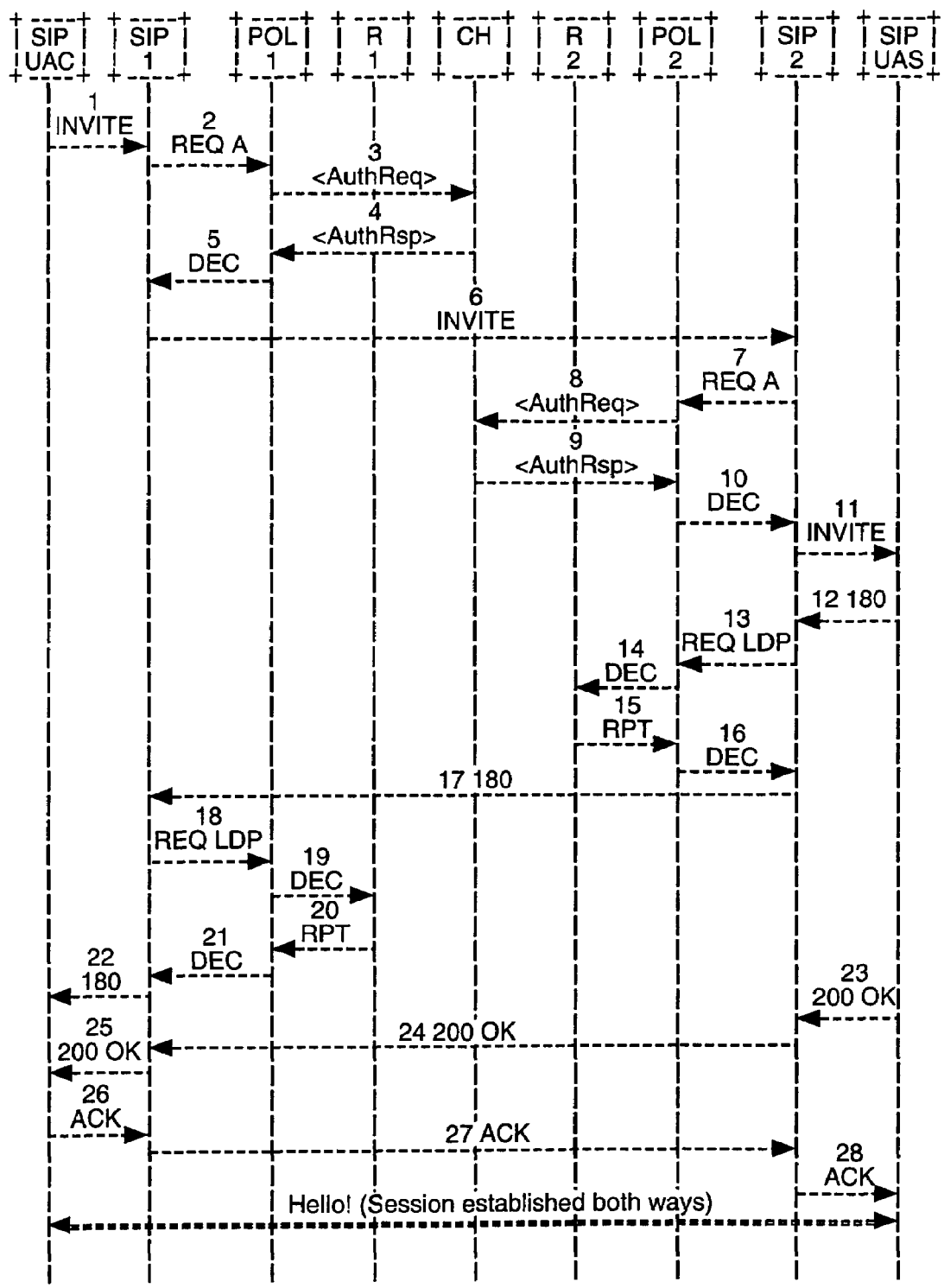
FIG. 5 shows a session initiation setup according to an embodiment of the present invention.

Referring to FIG. 5, at the origination end, there is a SIP user agent client UAC which is attempting to start a session, and the UAC has a local SIP proxy server SIP1, a local Policy server POL1, and a local Router R1. At the destination end, there is a SIP user agent server UAS, which the UAC is attempting to call, and the UAS has local SIP proxy server SIP2, a local Policy server POL2, and a local Router R2. Both the UAS and UAC share the same Clearinghouse CH, shown in the middle. Both POL1 and POL2 are acting as PDPs, and SIP1 and SIP2 are their corresponding PEPs. In the preferred embodiment, when the Clearinghouse sends a positive response to a resource usage request, the Clearinghouse also sends an authorization token. The unit receiving the call is the SIP user agent server UAS, which may be running in any type of IP telephone, computer, media device, or gateway. As stated above, both routers R1 and R2 are working based on the DiffServ model. Therefore, the routers will enforce QoS by altering the DS field in incoming session packets.

In general, the call setup request, authorization and policy installation occur as follows:

1) The UAC sends an INVITE message requesting call setup to SIP1;
2) SIP1 sends a REQ AAA message requesting authentication, authorization, and accounting for the UAC SIP session to the local policy server POL1;
3) Local policy server POL1 sends a <AuthReq> message to the clearinghouse server CH;
4) The Clearinghouse server CH responds with a <AuthRsp> authorizing the session and sending an authorization token to POL1;
5) POL1 sends a DEC message to SIP, authorizing installation of the session;
6) SIP1 now forwards the INVITE message to SIP2;
7) SIP2 sends a REQ AAA message requesting authentication, authorization, and accounting for the SIP session to the local policy server POL2;
8) Local policy server POL2 sends a <AuthReq> message to the clearinghouse server CH;
9) The clearinghouse server CH responds with a <AuthRsp> authorizing the session and sending an authorization token to POL2;
10) POL2 sends a DEC message to SIP2, authorizing installation of the session;
11) SIP2 now forwards the INVITE message to user agent server UAS;
12) UAS responds with a 180 RINGING message, which means the UAS is alerting the user to the session;
13) SIP2 sends a REQ LDP message to POL2. This message requests that the appropriate policy be loaded onto R2 concerning this session; it is a local decision point (LDP) message, because the local policy server POL2 will make this decision, not the clearinghouse;
14) POL2 sends a DEC message to R2, telling R2 of the appropriate policy for the session packets. Since this is a DiffServ environment, router R2 will enable QoS by filling in the DS field of the session packets appropriately when they arrive at the router R2;
15) R2 responds with a RPT message indicating that the policy a as installed:
16) POL2 informs SIP2 with a DEC message to install the same policy,
17) SIP2 now forwards the 180 RINGING message to SIP1;
18) SIP1 sends a REQ LDP message to POL1. This message requests that the appropriate policy be loaded onto R1 concerning this session: it is a local decision point (LDP) message, because the local policy server POL1 will make this decision, not the clearinghouse;
19) POL1 sends a DEC message to R1, telling R1 of the appropriate policy for the session packets. Since this is a DiffServ environment route R1 will enable QoS by filling in the DS field of the session packets appropriately when they arrive at the router R1;
20) R1 responds with a RPT message indicating that the policy was installed;
21) POL1 informs SIP1 with a DEC message to install the same policy,
22) SIP1 now forwards the 180 RINGING message to UAC:
23) UAS responds with a 200 OK message;
24) SIP2 forwards this message to SIP1;
25) SIP1 forwards this message to UAC;
26) UAC acknowledges with an ACK message;
27) SIP1 forwards the ACK message to the SIP2;
28) SIP2 forwards the ACK message to UAS;
29) The session or connection commences.

The actual sequence of messages is divided between the three protocols: message steps 1, 6, 11, 12, 17, and 22-9 are SIP messages; message steps 2, 5, 7, 10, 13-16, 18-21 are COPS messages; and message steps 3-4 and 8-9 are OSP messages. In this manner, the preferred embodiment of the present invention links the three protocols for call setup, authorization, and accounting. Although the above sequence has been described with a clearinghouse server, the preferred embodiment can work in a system without a clearinghouse. In such a network, the policy server handles most of the clearinghouse tasks, and message steps 3-4 and 8-9 would take place inside the policy server.

Figure 6:
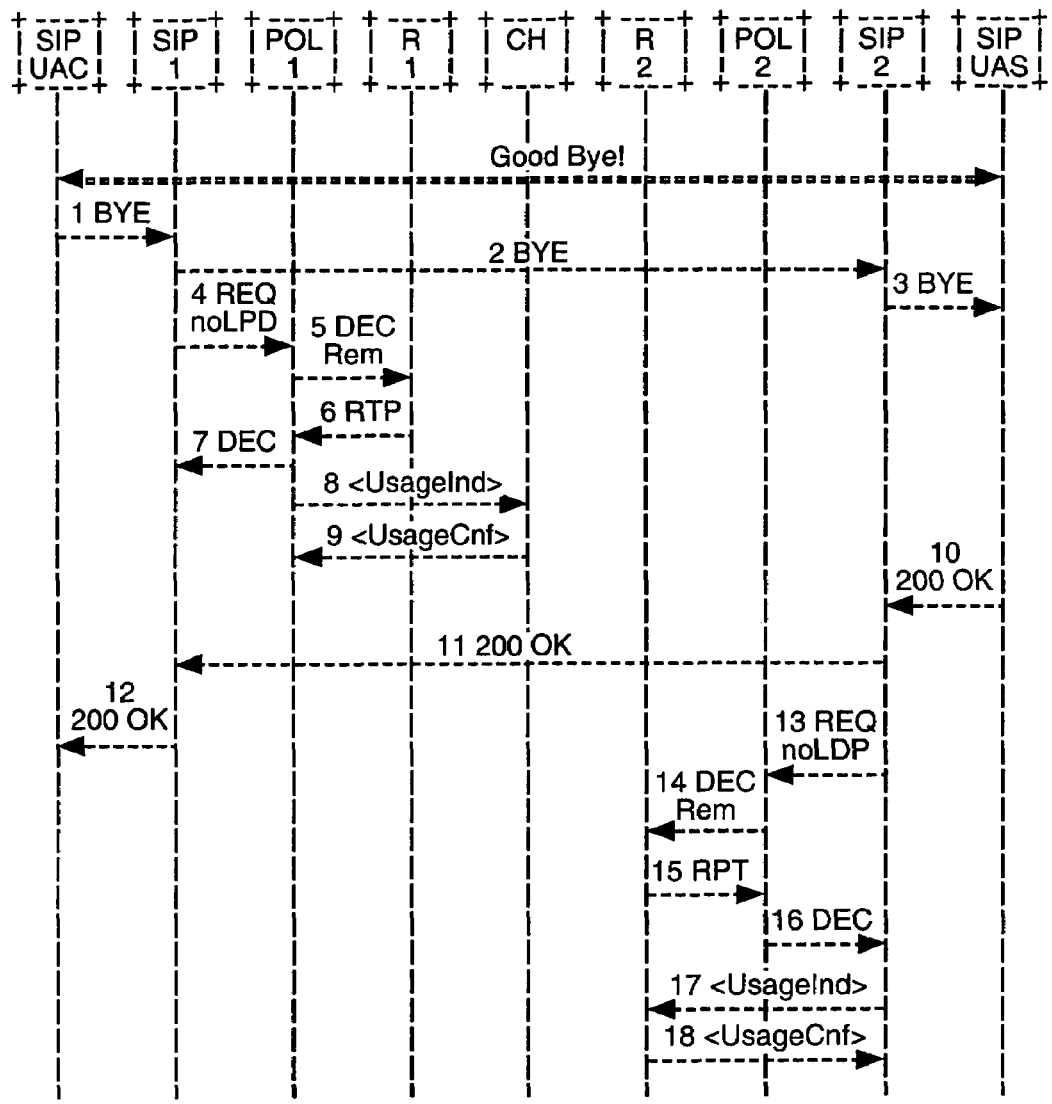
FIG. 6 shows a session teardown according to an embodiment of the present invention.

FIG. 6 shows the steps of a session teardown according to an embodiment of the present invention. The preferred embodiment also links together the protocols when ending a session, as shown in the following sequence of steps:

1) UAC signals the end of the session with a BYE message;
2) SIP1 forwards the BYE message to SIP2;
3) SIP2 forwards the BYE message to UAS,
4) SIP1 sends a REQ noLDP message canceling the policy given in the original REQ LDP message in message step 18 of the setup message sequence above;

5) POL1 sends a DEC Remove message to R1, telling the router to de-install the policy. Since this is a DiffServ environment, the router, up to this point, has been altering the DS fed in each of the session packets that arrived. Now, the router will de-install that policy, and stop looking for this session's packets;
6) R1 confirms the policy de-installation with a RPT message to POLL;
7) POL1 sends a DEC message to SIP1, telling the server to de-install the policy;
8) POL1 sends a <UsageInd> message detailing the resource usage to clearinghouse CH;
9) CH confirms with a <UsageCnf> message;
10) UAS sends a 200 OK message confirming receipt of the BYE message;
11) SIP2 forwards the OK message to SIP1;
12) SIP1 forwards the OK message to UAC;
13) SIP2 sends a REQ noLDP message canceling the policy given in the original REQ LDP message in step 13 of the setup message sequence above;
14) POL2 sends a DEC Rem message to R2, telling the router to de-install the policy. Since this is a DiffServ environment, the router, up to this point, has been altering the DS field in each of the session packets that arrived. Now, the router will de-install that policy, and stop looking for this session's packets;
15) R2 confirms the policy de-installation with a RPT message to POL2;
16) POL2 sends a DEC message to SIP2, telling the server to de-install the policy;
17) POL2 sends a <UsageInd> message detailing the resource usage to CH; and
18) CH confirms with a <UsageCnf> message;

As with the setup message sequence described above, the actual sequence of messages is divided between the three protocols: message steps 1, 6, 11, 12, 17, and 22-9 are SIP messages; message steps 2, 5, 7, 10, 13-16, 18-21 are COPS messages; and message steps 3-4 and 8-9 are OSP messages. In this manner, the preferred embodiment of the present invention links the three protocols for call tear-down and usage reporting. Although this has been described with a clearinghouse server, the preferred embodiment can work in a system without a clearinghouse. In such a network, the policy server handles most of the clearinghouse tasks, and message steps 3-4 and 8-9 would take place inside the policy server.

While an embodiment of the present invention has been shown and described, it is to be understood that many changes and modifications may be made thereunto without departing from the spirit and scope of the invention as defined in the appended claims.

What is claimed is:

1. A method of supporting data services over a network, the method comprising:
   receiving a request, in accordance with a first protocol specifying authorization and usage reporting, for authorization of a communication session from a policy server, wherein the policy server forwards the request, in accordance with a second protocol specifying policy deployment, in response to a message from a proxy server requesting authentication, authorization, and accounting, the proxy server initiating the communication session between clients in accordance with a third protocol specifying connection setup and teardown;
   selectively authorizing the request based on a Quality of Service (QoS) level associated with the communication session according to the first protocol; and
   transmitting an acknowledgement message to the policy server authorizing the communication at the QoS level based on the authorizing step, wherein the first protocol includes Open Settlement Policy (OSP), the second protocol includes Common Open Policy Service (COPS), and the third protocol includes Session Initiation Protocol (SIP).

2. A method according to claim 1, wherein the policy server communicates a QoS policy to a router supporting the communication session.

3. A method as recited in claim 2, wherein the router supports a Differentiated Services model.

4. A system for supporting differentiated voice services over a data network, the system comprising:
   a proxy server configured to receive, in accordance with a first protocol, a call setup request for establishment of a call over the data network and to generate, in accordance with a second protocol, a first request for authentication, authorization, and accounting for the call; and
   a policy server configured to receive the first request for authentication, authorization, and accounting and to generate, in accordance with a third protocol, a second request specifying a policy for the call based on the first request, wherein the policy server either forwards the second request to a clearinghouse server for authorization of the call in accordance with the third protocol or locally authorizes the call,
   wherein the proxy server transmits the call setup request to an agent operating in accordance with the first protocol for establishment of the call, and wherein the first protocol includes Session Initiation Protocol (SIP), the second protocol includes Common Open Policy Service (COPS), and the third protocol includes Open Settlement Policy (OSP).

5. A system according to claim 4, further comprising:
   a router configured to receive policy from the policy server, the policy relating to the manner of handling the call.

6. A system according to claim 5, wherein the router supports a Differentiated Services model.

7. An apparatus of supporting differentiated services in a data communication network, the apparatus comprising:
   an interface configured to receive, in accordance with a first protocol specifying authorization and usage reporting, a request for authorization of a communication session from a policy server, wherein the policy server forwards the request, in accordance with a second protocol specifying policy deployment, in response to a message from a proxy server requesting authentication, authorization, and accounting, the proxy server initiating the communication session between clients in accordance with a third protocol specifying connection setup and teardown; and
   a processor configured to selectively authorize the request based on a Quality of Service (QoS) level associated with communication session according to the first protocol and to generate an acknowledgement message for transmission to the policy server authorizing the communication at the QoS level based on the authorized request, wherein the first protocol includes Open Settlement Policy (OSP), the second protocol includes Common Open Policy Service (COPS), and the third protocol includes Session Initiation Protocol (SIP).

8. A system for supporting data services, the system comprising:
   a server configured to receive, in accordance with a plurality of communication protocols, information associated with a communication session in response to initiation of termination of the communication session, in accordance with a first protocol, between a first device and a second device, wherein the plurality of communication protocols includes the first protocol for communication session establishment, a second protocol for deploying policy, and a third protocol for authorization of the communication session according to a Quality of Service (QoS) level, wherein the information includes policy information conveyed by the second protocol, and at least one of resource usage, authorization, authentication, or accounting information conveyed by the third protocol; and a router configured to receive the information from the server for de-installing a QoS policy, in accordance with the second protocol, at the router, wherein the first protocol includes a Session Initiation Protocol (SIP), the second protocol includes Common Open Policy Service (COPS), and the third protocol includes Open Settlement Policy (OSP).

9. A system according to claim 8, wherein the Quality of Service policy is in accordance with a Differentiated Services model.

10. A system according to claim 8, wherein the router operates according to a Differentiated Services model.

11. A system according to claim 8, wherein the server is one of a plurality of policy servers, the system further comprising:

a clearinghouse server configured to store, in accordance with the third protocol, resource usage, policy, authentication, authorization and accounting information for each of the plurality of policy servers.

12. An apparatus for supporting data services over a network, the apparatus comprising:

means for receiving, in accordance with a first protocol specifying authorization and usage reporting, a request for authorization of a communication session from a policy server, wherein the policy server forwards the request, in accordance with a second protocol specifying policy deployment, in response to a message from a proxy server requesting authentication, authorization, and accounting, the proxy server initiating the communication session between clients in accordance with a third protocol specifying connection setup and teardown;

means for selectively authorizing the request based on a Quality of Service (QoS) level associated with the communication session according to the first protocol; and means for transmitting an acknowledgement message to the policy server authorizing the communication at the QoS level based on the authorization, wherein the first protocol includes Open Settlement Policy (OSP), the second protocol includes Common Open Policy Service (COPS), and the third protocol includes Session Initiation Protocol (SIP).

* * * * *